(12) United States Patent
Rijhsinghani et al.

(10) Patent No.: US 6,301,224 B1
(45) Date of Patent: Oct. 9, 2001

(54) NETWORK SWITCH WITH PANIC MODE

(75) Inventors: Anil G. Rijhsinghani, Marlborough, MA (US); G. Paul Koning, Wilton, NH (US)

(73) Assignee: Enterasys Networks, Inc., Rochester, NH (US)

( * ) Notice: Subject to any disclaimer, the term of this patent is extended or adjusted under 35 U.S.C. 154(b) by 0 days.

(21) Appl. No.: 09/006,241

(22) Filed: Jan. 13, 1998

(51) Int. Cl.[7] .................................................. H04L 12/56
(52) U.S. Cl. ........................... 370/227; 370/245; 370/401
(58) Field of Search ................................... 370/218, 221, 370/222, 225, 227, 238, 242, 245, 248, 230, 231, 232, 235, 236, 237, 389, 400, 401, 402, 406

(56) References Cited

U.S. PATENT DOCUMENTS

| | | | |
|---|---|---|---|
| 4,823,338 | 4/1989 | Chan et al. | 370/85 |
| 4,845,710 | 7/1989 | Nakamura et al. | 370/110.1 |
| 4,933,937 | 6/1990 | Konishi | 370/85.13 |
| 5,018,133 | 5/1991 | Tsukakoshi et al. | 370/16 |
| 5,138,615 | 8/1992 | Lamport et al. | 370/94.3 |

(List continued on next page.)

FOREIGN PATENT DOCUMENTS

| | | | |
|---|---|---|---|
| 0 404 337 | 12/1990 | (EP) | H04L/12/28 |
| WO 96/08899 | 3/1996 | (WO) | H04L/12/56 |

OTHER PUBLICATIONS

"Draft Standard P802.1Q/D7" IEEE Standards For Local and Metropolitan Area Networks: Virtual Bridged Local Area Networks, Oct. 3, 1997, XP002103631 Retrieved from Internet: <URL: ftp://p8021: –go _wildcats@8021.hep.net/ 802 1/g–drafts/d7> see p. 183–p. 186.

Liu N. H. et al."A New Packet Scheduling Algorithm For Input–Buffered Multicast Packet Switches" IEEE Global Telecommunications Conference, Phoenix, Arizona, Nov. 3–8, 1997, vol. 3, Nov. 3, 1997, pp. 1695–1699, XP000737812 Institute of Electrical and Electronics Engineers, see paragraph 1.

Mark B. L. et al.:"Large Capacity Multiclass ATM Core Switch Architecture" ISS '97. World Telecommunications Congress. (International Switching Symposium), Global Network Evolution: Convergence or Collision? Toronto, Sep. 21–26, 1997 vol. 1, Sep. 21, 1997, pp. 417–423 XP0000720547.

Chang C–Y et al.:"A Broadband Packet Switch Architecture with Input and Output Queueing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Prabhakar B. et al.:"Multicast Scheduling for Input–Queued Switches" IEEE Journal on Selected Areas in Communications, vol. 15,No. 5, Jun. 1, 1997, pp. 855–866, XP000657038 see paragraph 1.

*Primary Examiner*—Chau Ngyeun
*Assistant Examiner*—Soon-Dong Hyun

(57) ABSTRACT

A switch is provided for use in a communications system for transmitting traffic from a first user to a second user. The first and the second users are interconnected by a primary communications path and a redundant communications path. The switch includes a first port configured to receive hello communications indicative of a proper operation of the primary communications path and a second port for receiving data communications. A switch control monitors the receipt of the hello communications, directs the forwarding of received data communications up to a threshold capacity and, if the received data communications exceed the threshold capacity, drops at least a portion of the received data communications such that forwarded data communications are below the threshold capacity.

21 Claims, 5 Drawing Sheets

U.S. PATENT DOCUMENTS

| | | | |
|---|---|---|---|
| 5,237,661 | 8/1993 | Kawamura et al. | 395/250 |
| 5,321,693 | 6/1994 | Perlman | 370/85.13 |
| 5,394,402 | 2/1995 | Ross | 370/94.1 |
| 5,473,599 | 12/1995 | Li et al. | 370/16 |
| 5,500,860 * | 3/1996 | Perlman et al. | 370/401 |
| 5,594,732 | 1/1997 | Bell et al. | 370/401 |
| 5,617,421 | 4/1997 | Chin et al. | 370/402 |
| 5,619,495 | 4/1997 | Yamanaka et al. | 370/413 |
| 5,621,734 | 4/1997 | Mann et al. | 370/94.1 |
| 5,636,215 | 6/1997 | Kubo et al. | 370/397 |
| 5,734,824 * | 3/1998 | Choi | 370/254 |
| 5,734,865 | 3/1998 | Yu | 395/500 |
| 5,768,257 | 6/1998 | Khacherian et al. | 370/229 |
| 5,796,740 * | 8/1998 | Perlman et al. | 379/475 |
| 5,805,816 | 9/1998 | Picazo, Jr. et al. | 395/200.53 |
| 5,808,056 | 9/1998 | Amato et al. | 540/360 |
| 5,838,677 | 11/1998 | Kozaik et al. | 370/389 |
| 5,889,762 * | 3/1999 | Pajuvirta et al. | 370/230 |
| 5,892,922 | 4/1999 | Lorenz | 395/200.6 |
| 5,959,990 | 9/1999 | Frantz et al. . | |
| 6,023,563 | 2/2000 | Shani . | |
| 6,111,876 | 8/2000 | Frantz et al. . | |
| 6,128,655 | 10/2000 | Iturrald . | |

* cited by examiner

NETWORK SWITCH WITH PANIC MODE

FIELD OF THE INVENTION

The present invention relates generally to communications network switches and more particularly to network switches having a panic mode of operation for facilitating communication on a redundant communication path.

BACKGROUND OF THE INVENTION

Local Area networks (LAN's) are used to facilitate communications between a number of users. Individual LAN's may be bridged together to allow a large number of users to communicate amongst themselves. These bridged LAN's may be further interconnected with other bridged LAN's using routers to form even larger communications networks.

Prior art FIG. 1 depicts an exemplary interconnected bridged LAN system. The numerals 10, 20, 30, etc., are used to identify individual LAN's. Bridges between LAN's are designated by the numerals 5, 15, 25 and 35. A router between bridged LAN 100 and bridged LAN 200 is identified with the reference numeral 300. In the prior art bridged LAN system depicted, a user A is able to communicate with a user B without leaving the LAN 10.

If user A desires to communicate with user C in LAN 20 or user D in LAN 30, the communication is transmitted via bridges 5 and/or 15. If user A desires to communicate with user E, the communication must be routed via router 300 to bridged LAN 200. As will be understood by those skilled in the art, bridges operate at layer 2 of the network model and transparently bridge two LAN's. It is transparent to users A and C that communications between them are ported over bridge 5 because layer 2 bridges do not modify packets, except as necessary to comply with the type of destination LAN. However, if user A wishes to communicate with user E, the communication must be ported via router 300 which operates at level 3 of the network model.

LAN network administrators generally attempt to connect together those users who frequently communicate with each other in bridged LAN's. However, if the bridged LAN becomes too large, it becomes unscalable and may experience various well-known problems. Accordingly, routers are used to interconnect bridged LAN's so that the bridged LAN's themselves can be kept to an acceptable size. This results in delays in communications between users which are transmitted via the router 300. If, for example, in FIG. 1, user E and user A need to communicate frequently, it would be advantageous to interconnect LAN 10 and LAN 50 via a bridge rather than the router 300. This would require system rewiring, which is costly and may be impracticable under many circumstances, such as, if users A and E will only need to frequently communicate for a limited period of time.

It is often beneficial in bridged LAN's and other types of communication systems or networks for redundant communication paths to be provided. Referring again to FIG. 1, a switch 37 in bridged LAN 200 provides a redundant communication path between LAN 50 and LAN 60.

Prior art FIG. 2 depicts another communication system having redundant communications paths. As shown, the system includes LAN's 305–330. LAN 305 is connected to LAN 310 by switch 340. LAN 310 is connected to LAN 315 by a switch 350. This provides a primary communication path between LAN's 305 and 315. Accordingly, during normal operations communications between users X and Y are directed through switches 340 and 350 along the communication path 410. A redundant path 420 is also shown connecting LAN's 305 and 315. This path is under the control of switch 360 which also connects LAN 305 with LAN's 320–330. Conventional switch 360 includes a switch controller which implements forward processing and spanning tree processing, the latter in accordance with a spanning tree protocol.

Each of the switches periodically exchange hello messages, typically at a frequency of once per second. It will be recognized by those skilled in the art that data communications are being received by switch 360 at a substantially higher frequency and that tens of thousands, if not hundreds of thousands of data communications packets may be received by the switch 360 every second. Based upon the spanning tree protocol implemented by the switch 360, data traffic between users X and Y is prohibited by switch 360 from transmission via the redundant communication path 420 as long as the hello messages are periodically received.

If a succession of hello messages are not received from either of switch 340 or switch 350, for example, fifteen successive hello messages are missed, the switch 360, in accordance with the spanning tree protocol, opens the redundant communication path and allows communications between users X and Y to be transmitted via the redundant link 420. This is intended to ensure that the redundant communication path is only available for transmitting communications between LAN's 305 and 315 when the primary communication path 410 has failed. As those skilled in the art will recognize, if both communication paths 410 and 420 are simultaneously open to traffic, a network loop will be formed which will result in an extreme overloading of the system which is, in turn, likely to bring the network down.

Conventional switches 340–360 may have a threshold capacity over which the switch is unable to forward received traffic. Accordingly, each switch is configured such that when the amount of received traffic exceeds the threshold capacity or limit, the excess traffic may be simply dropped. However, this dropping of traffic may also result in anomalies in the switch 360 monitoring of the hello messages. More particularly, if hello messages are dropped along with excess data communications, the switch 360 will erroneously conclude that the primary communication path 410 is inoperable and therefore open the redundant communication path 420 unnecessarily, thereby causing a network loop which will overload and bring down the system.

SUMMARY OF THE INVENTION

Accordingly, it is an object of the present invention to provide a communications switch which controls a redundant communication link in an enhanced manner.

It is another object of the present invention to provide a communications switch which routes data traffic over a redundant communications link in such a way that network communications loops are avoided.

It is a further object of the present invention to provide a communication switch which does not unnecessarily route data traffic over a redundant communications link.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

In accordance with the present invention, a communications switch is provided for use in transmitting traffic from a first user to a second user in cases where the first and the second users are interconnected by primary and redundant communications paths. The switch includes a first port configured to receive periodic hello communications indicative of a proper operation of the primary communications path. During normal operations, a switch control monitors the receipt of hello communications, and directs the forwarding of the received data communications up to a threshold capacity or limit. The hello communications typically are received at a first frequency, e.g., once per second, and the data communications are received at a second frequency, e.g., tens of thousands per second, which is much greater than the first frequency. In situations where the received data communications exceed the threshold capacity, the switch control drops at least a portion, and preferably all, of the received data communications such that forwarded data communications are at least below, and beneficial well below, the threshold capacity, if not eliminated completely.

According to other aspects of the invention, the switch control detects a failure to receive the hello communications and directs the forwarding of communications between the first user and the second user over the redundant communications path responsive thereto. Advantageously, the switch control detects the failure to receive successive hello communications, and preferably directs the forwarding of communications over the redundant communications path responsive to a failure to receive a particular number of successive hello communications, for example 15. The switch control drops the received data communications responsive to detecting a failure to receive a lesser number of successive hello communications, for example 8, and/or if the received data communications exceed the threshold capacity.

The switch control operation ensures that hello communications will not be dropped due to the received communications exceeding the threshold capacity, which could result in the switch erroneously concluding that the primary communications path is not operating properly. In such a case, the switch control would direct communications between the first and second users over the redundant communications path causing a network loop and potentially bringing the system or network down. Accordingly, it is preferred that the switch control direct the forwarding communications between the first user and the second user along the redundant path only after it detects a failure to receive a further successive hello communications subsequent to dropping of all of the received data communications.

In accordance with other aspects of the invention, a communication system for transmitting traffic from a first user to a second user includes primary and redundant communications paths connecting the first and second users. A switch is disposed in the redundant communications path to receive periodic hello communications indicative of a proper operation of the primary communications path and data communications between system users. The switch is capable of forwarding received data communications up to a threshold capacity or other limit. If the switch detects a failure to receive a first number of successive hello communications, it will preferably drop all of the received data communications. The switch will also forward communications between the first user and the second user along the redundant path responsive to the subsequent detection of a failure to receive a second number of successive hello communications.

DESCRIPTION OF THE PREFERRED EMBODIMENT

Figure 1:
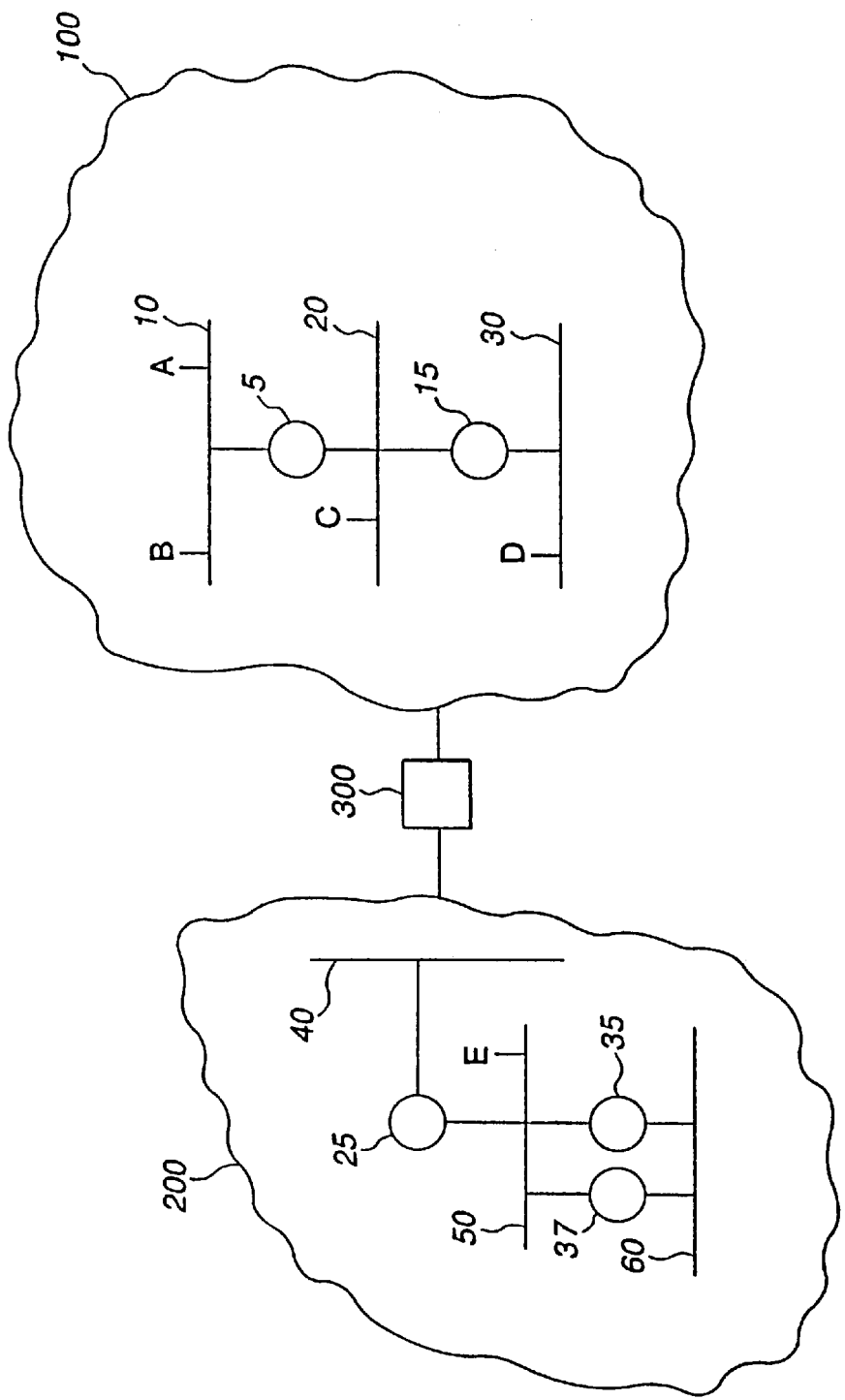
FIG. 1 depicts a prior art LAN configuration.
Figure 2:
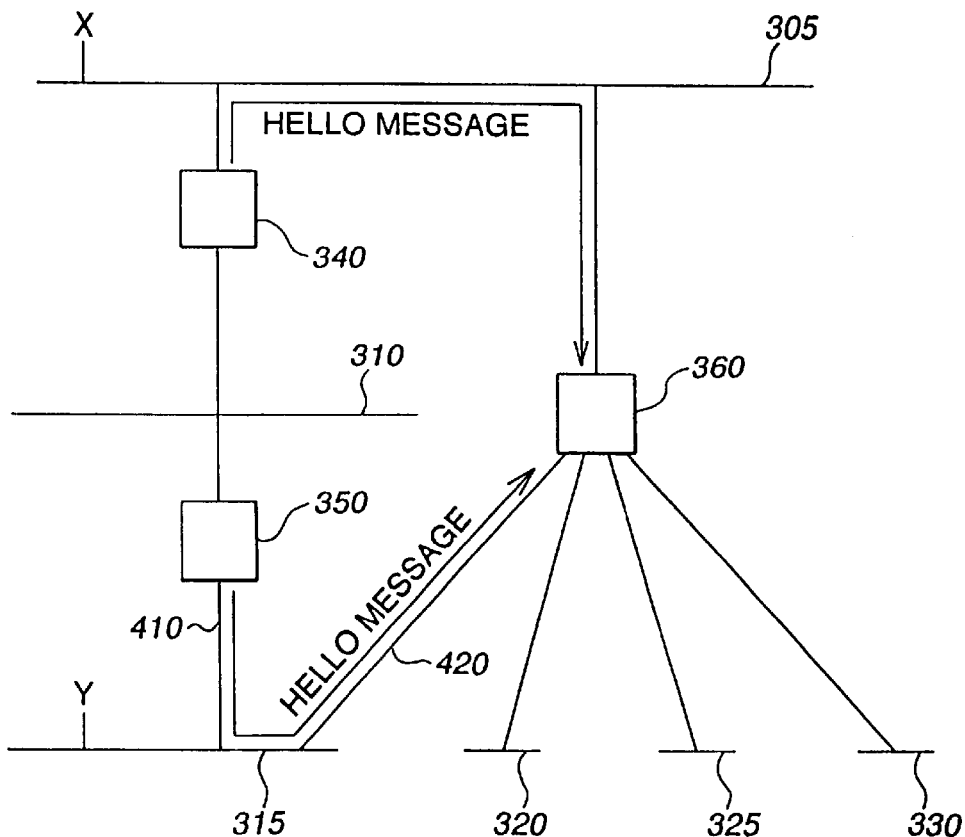
FIG. 2 depicts another prior art redundant communication network.
Figure 3:
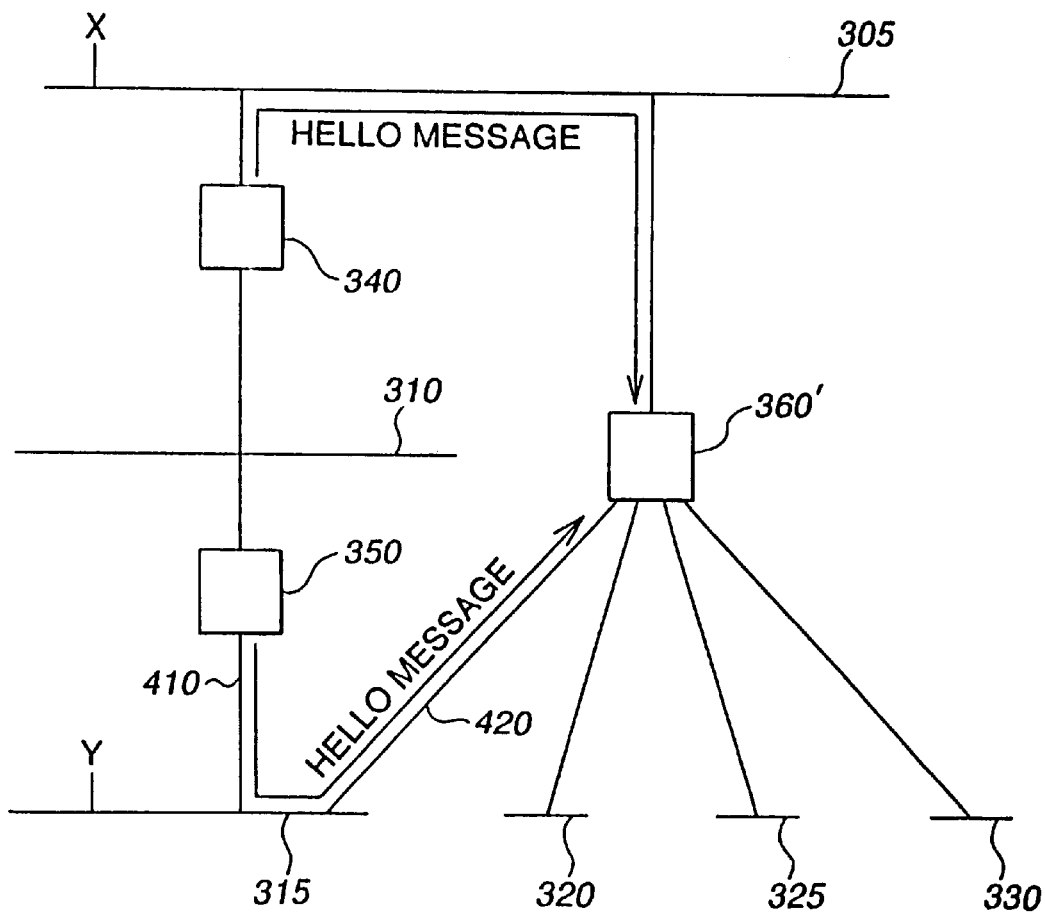
FIG. 3 depicts a redundant communication network in accordance with the present invention.

FIG. 3 depicts a redundant network or system similar to the system depicted in FIG. 2 and like components are referenced with identical reference numerals. As depicted in FIG. 3, LAN's 305–330 are interconnected by switches 340, 350 and 360'. Redundant communication paths 410 and 420 interconnect LAN 305 with LAN 315. The primary communication link 410 includes switches 340 and 350. The redundant communication link 420 includes switch 360' connecting LAN 305, which, for example, could be a high-speed backbone LAN, to LAN's 315–330.

The switches 340, 350 and 360 each include spanning tree processing which implements a spanning tree protocol. The switches also include forward processing for forwarding received data communications. Switches 340 and 360 are shown to be conventional but could, if desired, be configured and programmed in accordance with the present invention, as will be described in detail below with reference to switch 360'.

During normal operations, communications between users X and Y are transmitted over the primary communication path 410 via switches 340 and 350. To avoid opening a loop in the network, each of the switches 340 and 350 transmit hello messages to the switch 360' at a frequency of once per second, indicating that the primary communication link is operating to transmit communications between users X and Y.

It will be noted that switch 360' receives not only the hello messages but also a substantial amount of data traffic for forwarding to LAN's 320–330. So long as the hello messages are received by switch 360' from switches 340 and 350, switch 360' prohibits communications over the redundant communication link 420 between LAN's 305 and 315 so that a network loop is avoided. It will be recognized that although switch 360' is shown as a dynamic multiported switch, the present invention is equally applicable to conventional bridges and other types of switching or bridging devices.

The switch 360' maintains a count of any successively missed hello messages. Accordingly, if switch 360' fails to detect fifteen consecutive hello messages from either switch 340 or switch 350, switch 360' opens the redundant communication path 420 to allow communications between LAN 305 and 315. If the data traffic received at switch 360' exceeds the capacity of the switch to forward communications to the LAN's 320–330, switch 360', if conventionally configured, would proceed to drop all received traffic exceeding its threshold capacity and continue forwarding data traffic at the fully capacity level. For example, if the switch 360' has a forwarding capacity of sixty thousand packets of information per second and the received traffic between LAN's 305 and 320–330 s ninety thousand packets per second, the switch 360' would conventionally drop thirty thousand packets of information per second and continue to forward the remaining sixty thousand packets of data traffic.

As discussed above, this could result in hello messages from switch 340 and/or switch 350 being dropped. That is, the thirty thousand packets of dropped data could include successive hello messages from either or both of switches 340 and 350. Accordingly, the switch 360' could be fooled into believing that the primary communication path 410 is inoperable and, therefore, open up the redundant path 420 between LAN's 305 and 315, resulting in a network loop.

Figure 4:
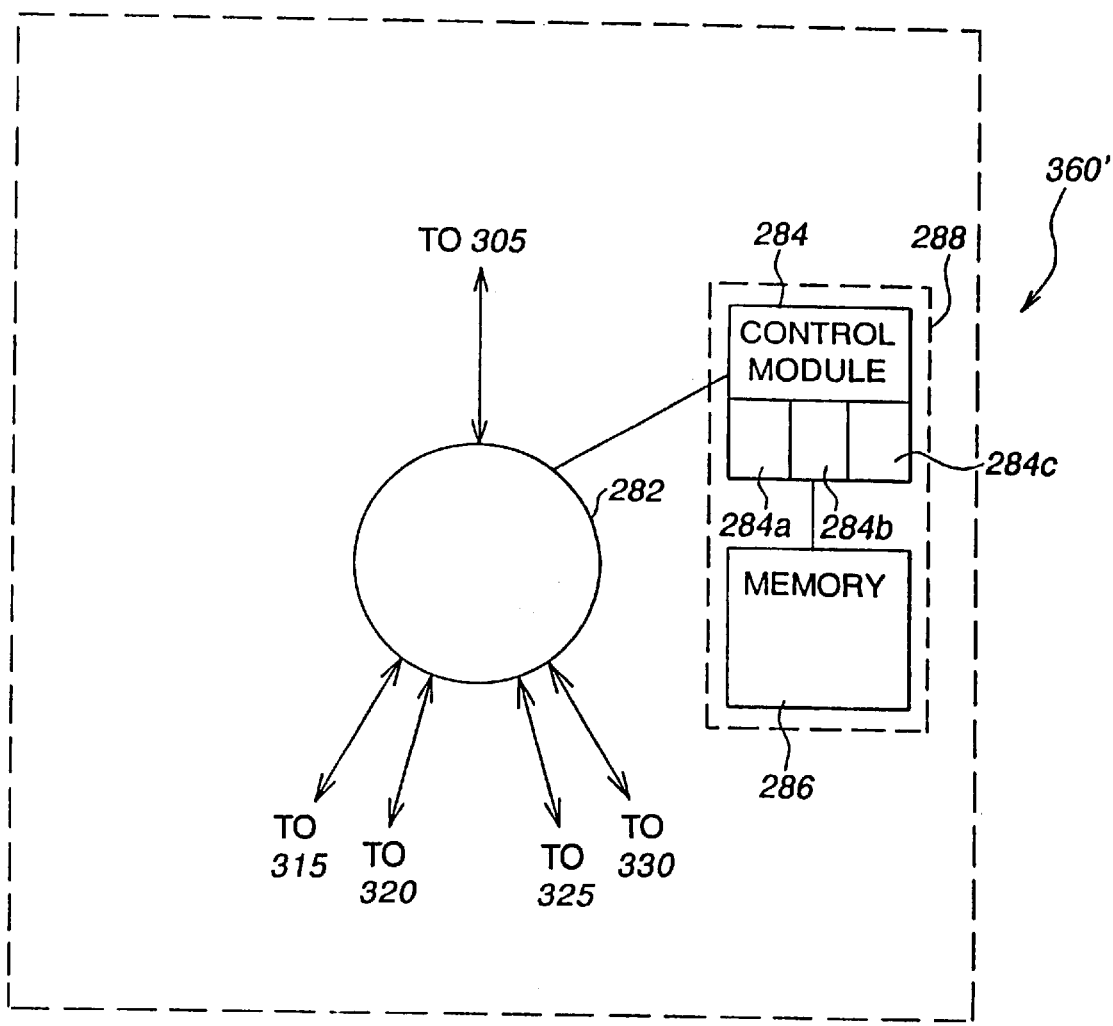
FIG. 4 depicts a communication switch in accordance with the present invention.

To solve this problem, switch 360' is programmed to conservatively assess the operability of the primary communication link 410 and to only go into a panic mode if it determines that link 410 has become inoperable. FIG. 4 provides a schematic depiction of the switch 360'. As indicated, the switch 360' includes a switching device 282 for forwarding communications between LAN 305 and LAN's 315–330.

The switching device 282 is controlled by the switch control 288, which includes a control module 284 and memory 286. The control module includes a detector 284a for detecting traffic received from the LAN's 305 and 315–330, including hello messages from switches 340 and 350. The control module 284 also includes a controller 284b for controlling the switching device 282 in accordance with instructions received from the processor 284c, which processes information in accordance with stored programming instructions on the memory 286. These particular components can be implemented in any number of ways as will be well understood by those skilled in the art. It should be recognized that the memory itself may be magnetic, electrical, optical or another type of device capable of storing this necessary instructions and information to allow the control module 284 to operate in the described manner.

Figure 5:
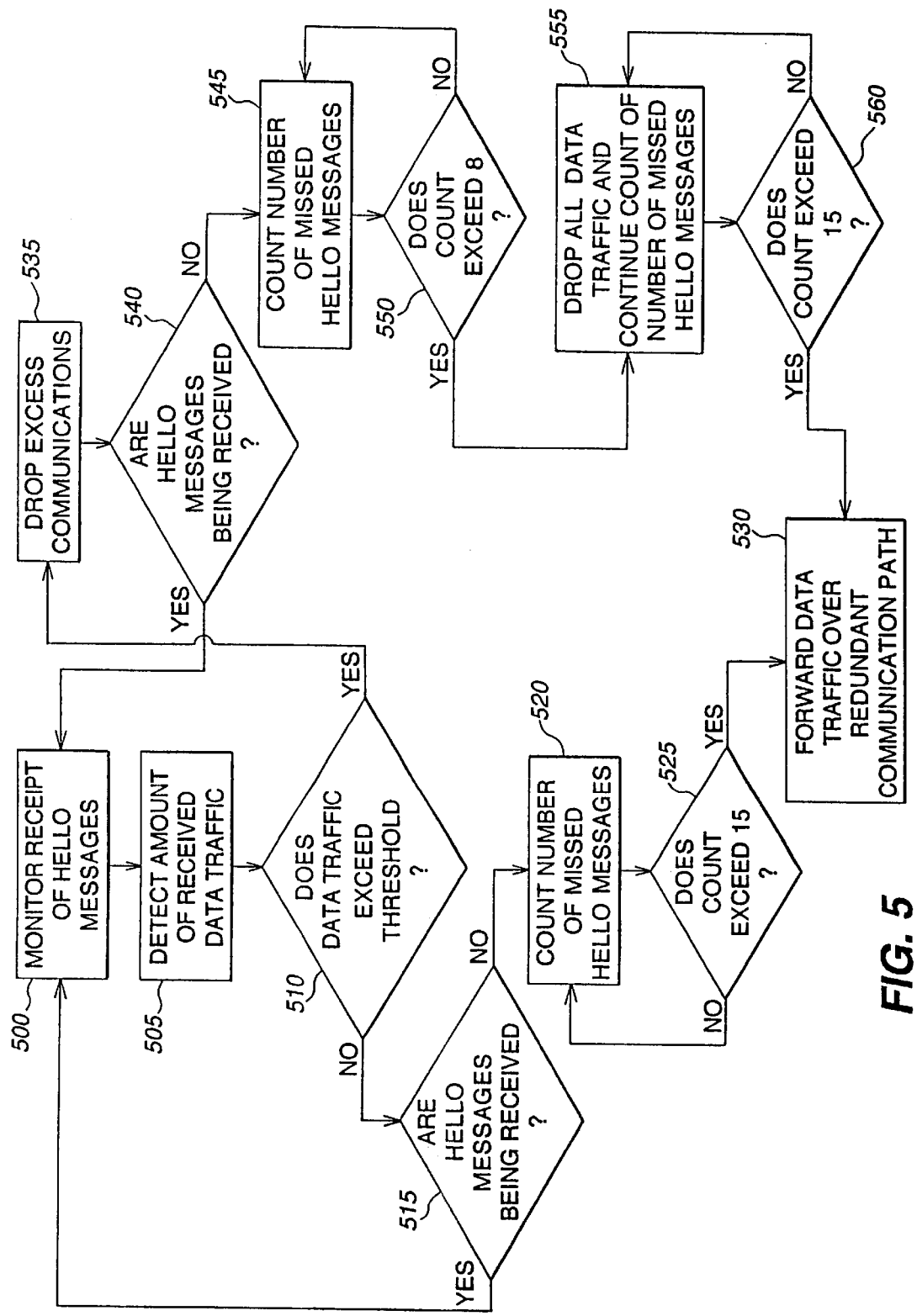
FIG. 5 is a flow chart of the process implemented by the switch depicted in FIG. 4.

FIG. 5 depicts a flow chart of the steps performed by the switch 360' in accordance with the present invention. It will be understood that the switch 360' may perform numerous other steps in communicating information between LAN 305 and LAN's 315–330 which are not shown in the flow chart of FIG. 5 in order to avoid superfluous information which is unnecessary to the skilled artisan's understanding of the present invention.

The operation of the switch 360' will now be described with reference to FIGS. 3–5. As indicated above, during normal operations switch 360' receives data communications which are forwarded between LAN's 305 and 320–330. Switch 360', however, prohibits the flow of any traffic between LAN 305 and LAN 315 and, hence, the redundant communication link 420 remains closed while communications between LAN's 305 and 315 are transmitted via the primary communication link 410.

Detector 284a of the switch 360' detects data communications and hello messages. The switch control processor 284c operates to monitor the detected hello messages as well as the data traffic as indicated in step 500. In this regard, the processor 284c maintains a count of a number of successively missed hello messages from either switch 340 or switch 350. The processor 284c also maintains information regarding the amount of data traffic received by the switch 360', as indicated in step 505. So long as hello messages are received and the data communications are below the switch capacity, the controller 284b, in accordance with the standard forward processing performed on processor 284c, controls the switching device 282 to forward all received traffic between LAN's 305 and 320–330.

In step 510 the processor 284c determines if the data traffic detected by detector 284a exceeds the switch threshold, e.g., sixty thousand packets per second. If not, in step 515 the processor 284c determines if hello messages are being successively received. If so, the processor 284c continues with the monitoring at step 500. If successive hello messages are not being received, the processor 284c maintains, in conjunction with the memory 286, a count of the number of successively missed hello messages, as indicated in step 520.

In step 525, the processor 284c determines if fifteen successive hello messages from either of switches 340 or 350 have not been received. If not, the count of the number of successively missed hello messages continues at step 520. However, if fifteen successive hello messages have been missed, the processor 284c instructs the controller 284b to control the switching device 282 to forward communications between LAN 305 and 315 via the redundant communication path 420. Accordingly, once detector 284a has failed to detect fifteen consecutive hello messages, i.e., a period of fifteen seconds has gone by without receiving a hello message from one of either switch 340 or switch 350, the switch 360' concludes that the primary communication path 410 has become inoperable and begins transmitting communications between LAN 305 and LAN 315 as indicated by step 530.

If, in step 510, the data communications exceed the threshold of switch 360', e.g., exceed sixty thousand packets per second, the processor 284c directs the controller 284b to control the switching device 282 to drop the excess communications traffic as indicated in step 535. In this regard, the switch 360' does not distinguish between data traffic and hello messages. Accordingly, hello messages as well as data communications may be dropped prior to being detected by the detector 284a.

In step 540 the controller determines if the successive hello messages are being received one per second. If so, the processor 284c continues its monitoring function in step 500. If, however, successive hello messages have been missed, the processor maintains a count of the number of successively missed hello messages as indicated in step 545.

In step 550 the switch 360' determines if the number of successively missed hello messages equals eight, or some other desired count threshold. If not, the processor 284c continues to maintain a count of successively missed hello messages, as indicated in step 545. If however, the detector 284a fails to detect eight successive hello messages, the switch 360' goes into a panic mode. In this regard, the processor 284c directs the controller 284b to control the switching device 282 to drop all received data communications, as indicated by step 555.

Accordingly, if hello messages are being transmitted by switches 340 and 350 to the switch 360' but have not been detected because they have been dropped as part of the excessive traffic, by dropping all data traffic any subsequently transmitted hello message should be detected by the detector 284a thereby stopping the count of missed hello messages prior to the count exceeding the second count threshold of fifteen, as indicated in step 560, responsive to which the switch 360' opens the redundant communication path 420. This is because the switch can drop packets much faster than it can forward traffic; in particular, it can drop packets as fast as the maximum theoretical rate at which they can be received.

Hence, switch 360' is configured so that the redundant communication link 420 is opened only after the switch 360' has confirmed that a predefined number of successive hello messages have not been received from either of the switches 340 or 350 due to a fault in the primary communication path 410 rather that due to being dropped as part of excess communications traffic received at the switch 360'.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A switch for use in a communications system for transmitting traffic from a first user to a second user, the first and second users being interconnected by a primary communications path and a redundant communications path, the switch comprising:

one or more ports to receive hello communications indicative of a proper operation of the primary communications path and to receive data communications; and a switch control to monitor receipt of the hello communications, wherein the hello communications are received periodically, to direct forwarding of received data communications up to a threshold, and to drop at least a portion of the received data communications such that forwarded data communications are below the threshold if (i) the received data communications exceeds the threshold and (ii) a failure to receive a first number of successive ones of the periodic hello communications is detected, wherein the switch control is further operative to detect a failure to receive successive ones of the periodic hello communications, and to direct a forwarding of communications between the first user and the second user along the redundant communications path responsive to detecting a failure to receive a second number, which is greater than the first number, of the successive ones of the periodic hello communications.

2. The switch according to claim 1, wherein the hello communications are received at a first frequency and the data communications are received at a second frequency greater than the first frequency.

3. A switch for use in a communications system for transmitting traffic from a first user to a second user, the first and second users being interconnected by a primary communications path and a redundant communications path, the switch comprising:

one or more ports to receive hello communications indicative of a proper operation of the primary communications path and to receive data communications; and a switch control to monitor receipt of the hello communications, wherein the hello communications are received periodically, to direct forwarding of received data communications up to a threshold, and if the received data communications exceed the threshold, to drop at least a portion of the received data communications such that forwarded data communications are below the threshold, wherein the switch control is further operative to detect a failure to receive successive ones of the periodic hello communications, to drop all of the received data communications responsive to a failure to receive a first number of successive ones of the periodic hello communications, and to direct a forwarding of communications between the first user and the second user along the redundant communications path responsive to detecting a failure to receive a second number, greater than the first number, of the successive ones of the periodic hello communications.

4. The switch according to claim 3, wherein:

the switch control is further operative to direct the forwarding of communications between the first user and the second user along the redundant communications path after a failure to receive further successive ones of the periodic hello communications subsequent to the dropping of all of the received data communications.

5. A method of transmitting communications between a first user and a second user, the first and the second users being interconnected by a primary communications path and a redundant communications path having a switch, the method comprising the acts of:

receiving hello communications indicative of a proper operation of the primary communications path;

receiving data communications at the switch;

monitoring receipt of the hello communications, wherein the hello communications are received periodically; and forwarding received data communications up to a threshold; and dropping all of the received data communications if the received data communications exceed the threshold and the failure to receive a first number of successive ones of the periodic hello communications is detected; and forwarding communications between the first user and the second user along the redundant path in response to a failure to receive a second number of successive ones of the hello communications.

6. The method according to claim 5, wherein the received data communications are communications between the first user and the second user.

7. The method according to claim 5, wherein the hello communications are received at a first frequency and the data communications are received at a second frequency greater than the first frequency.

8. The method according to claim 5, wherein the first number is less than the second number.

9. The method according to claim 8, wherein the forwarding of communications between the first user and the second user along the redundant communications path is performed responsive to a failure to receive further successive ones of the periodic hello communications subsequent to the dropping of all of the received data communications.

10. A communications system for transmitting traffic from a first user to a second user, the system comprising:

a first communications path connecting the first and the second users;

a second communications path redundantly connecting the first and the second users; and a switch disposed in the second communications path configured (i) to receive periodic hello communications indicative of a proper operation of the first communications path, (ii) to receive data communications between systems users, (iii) to direct a forwarding of the received data communications up to a threshold, (iv) to detect a failure to receive a first number of successive ones of the periodic hello communications, (v) to drop all of the received data communications responsive to detecting the failure to receive the first number of successive ones of the periodic hello communications, and (vi) to forward communications between the first user and the second user along the second communications path responsive to detecting, subsequent to the dropping of all the received data communications, a failure to receive a second number of successive ones of the periodic hello communications.

11. A method of transmitting traffic from a first user to a second user interconnected by a primary communications path and a redundant communications path having a switch disposed therein, the method comprising the acts of:

receiving periodic hello communications indicative of a proper operation of the primary communications path;

dropping all data communications received at the switch in response to a failure to receive a first number of successive ones of the periodic hello communications; and operating the switch to forward communications between the first user and the second user along the redundant communications path subsequent to the dropping of all of the received data communications, based on a failure to receive an additional number of successive ones of the periodic hello communications.

12. A system for transmitting traffic from a first user to a second user interconnected by a primary communications path and a redundant communications path having a switch disposed therein, the system comprising:

means for receiving periodic hello communications indicative of a proper operation of the primary communications path;

means for dropping all data communications received at the switch in response to a failure to receive a first number of successive ones of the periodic hello communications; and means for operating a switch to forward communications between the first user and the second user along the redundant communications path subsequent to the dropping of all of the received data communications, based on a failure to receive an additional number of successive ones of the periodic hello communications.

13. A switch for use in a communications system for transmitting traffic from a first user to a second user, the first and second users being interconnected by a primary communications path and a redundant communications path, the switch comprising:

one or more ports to receive periodically hello communications indicative of a proper operation of the primary communications path and to receive data communications; and a switch control to:

monitor receipt of the periodic hello communications;

direct a forwarding of the received data communications until the received data communications reach a threshold capacity;

in response to the received data communications exceeding the threshold capacity, drop at least a portion of the received data communications such that forwarded data communications are below the threshold capacity; and in response to a failure to detect reception of a first number of successive periodic hello communications subsequent to the dropping of the at least a portion of the received data communication, drop all of the received data communications.

14. The switch according to claim 13, wherein the first port is operative to receive the hello communications at a first frequency and to receive the data communications at a second frequency greater than the first frequency.

15. The switch according to claim 13, wherein the switch control is further operative to, in response to a failure to receive an additional number of successive ones of the periodic hello communications subsequent to the dropping of all of the received data communications, direct the forwarding of first communications between the first user and the second user along the redundant path.

16. A method of transmitting communications between a first user and a second user, the first and second users being interconnected by a primary communications path and a redundant communications path having a switch, the method comprising acts of:

periodically receiving hello communications indicative of a proper operation of the primary communications path;

receiving data communications at the switch;

monitoring receipt of the periodic hello communications;

directing a forwarding of the received data communications until the received data communications reach a threshold capacity;

in response to the received data communications exceeding the threshold capacity, dropping at least a portion of the received data communications such that forwarded data communications are below the threshold capacity; and in response to detecting reception of a first number of successive periodic hello communications subsequent to the dropping of the at least a portion of the received data communications, dropping all of the received data communications.

17. The method of claim 16, wherein the hello communications are received at a first frequency and the data communications are received at a second frequency greater than the first frequency.

18. The method of claim 16, the method further comprising acts of:

subsequent to the dropping of all of the received data communications, detecting a failure to receive an additional number of successive ones of the periodic hello communications; and in response to detecting the failure to receive the additional number of successive ones of the periodic hello communications, directing the forwarding of first communications between the first user and the second user along the redundant path.

19. A system for transmitting communications between a first user and a second user, the first and second users being interconnected by a primary communications path and a redundant communications path having a switch, the system comprising:

means for periodically receiving hello communications indicative of a proper operation of the primary communications path;

means for receiving data communications at the switch;

means for monitoring receipt of the periodic hello communications;

means for directing a forwarding of the received data communications until the received data communications reach a threshold capacity;

means for dropping, in response to the received data communications exceeding the threshold capacity, at least a portion of the received data communications such that forwarded data communications are below the threshold capacity; and means for dropping, in response to detecting reception of a first number of successive periodic hello communications subsequent to the dropping of the at least a portion of the received data communications, all of the received data communications.

20. The system of claim 19, wherein the hello communications are received at a first frequency and the data communications are received at a second frequency greater than the first frequency.

21. The system of claim 19, the method further comprising:

means for detecting, subsequent to the dropping of all of the received data communications, a failure to receive an additional number of successive ones of the periodic hello communications; and means for directing, in response to detecting the failure to receive the additional number of successive ones of the periodic hello communications, the forwarding of first communications between the first user and the second user along the redundant path.

* * * * *